United States Patent [19]

Habicht

[11] Patent Number: 5,117,601

[45] Date of Patent: Jun. 2, 1992

[54] CONNECTING SECTION, ESPECIALLY FOR A WINDOW, DOOR OR FACADE WALL

[75] Inventor: Siegfried Habicht, Leopoldshöhe, Fed. Rep. of Germany

[73] Assignee: Schüco International KG, Bielefeld, Fed. Rep. of Germany

[21] Appl. No.: 621,264

[22] Filed: Dec. 3, 1990

[30] Foreign Application Priority Data

Dec. 2, 1989 [DE] Fed. Rep. of Germany ....... 3939968

[51] Int. Cl.⁵ .............................................. E06B 3/26
[52] U.S. Cl. ..................................... 52/281; 52/398; 52/773; 52/475; 52/476
[58] Field of Search ................ 52/397, 398, 399, 475, 52/656, 773, 775, 730, 476

[56] References Cited

U.S. PATENT DOCUMENTS 3,423,897  1/1969  Birum, Jr. ............................ 52/773
4,333,295  6/1982  Janke ................................... 52/398

FOREIGN PATENT DOCUMENTS 2937454  6/1982  Fed. Rep. of Germany .

Primary Examiner—David A. Scherbel
Assistant Examiner—Wynn E. Wood
Attorney, Agent, or Firm—Michael J. Striker

[57] ABSTRACT

The connecting section includes two metal sections held spaced from each other by at least one isolating bar having at least one recess extending longitudinally therein. Each of the metal sections are provided with at least one isolating bar-receiving groove and at least one grooved longitudinal member. Each of the grooved longitudinal members of the metal sections are fitted in a recess in the isolating bars by elastic deformation and each of the isolating bars have at least one slot opening to the adjacent metal section. The metal wire is sunk into the metal section and the isolating bar on deformation of the grooved longitudinal member. To provide a more uniform sinking of the metal wire in the slot over the entire length of the metal section, the metal wire (11) is made up of a linear core wire strand (12) and an outer wire strand (13) helically wound about the core wire strand (12) in a plurality of coil turns (14), adjacent turns of the outer wire strand being spread apart so that they do not contact each other (FIG. 3).

8 Claims, 3 Drawing Sheets

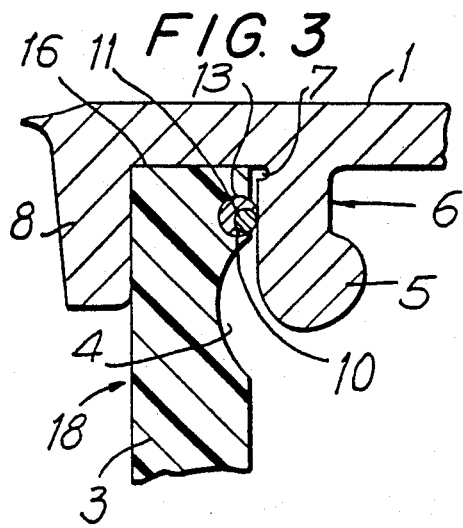
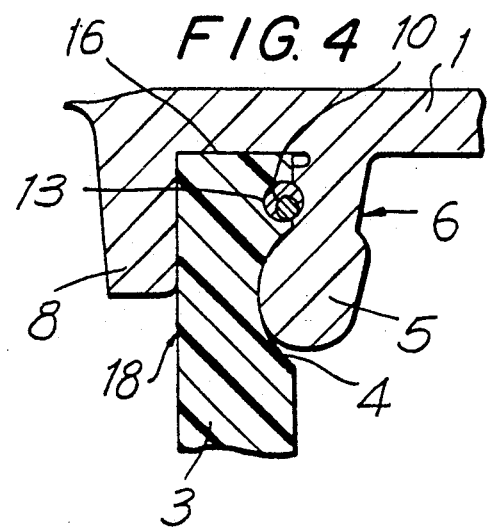
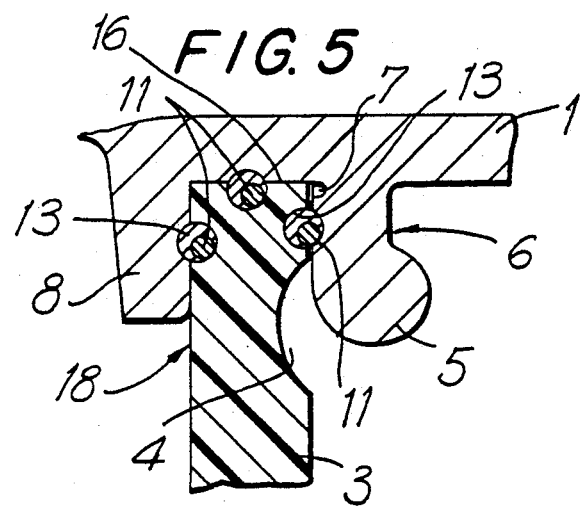
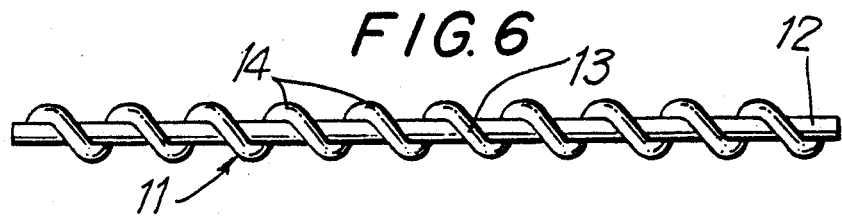

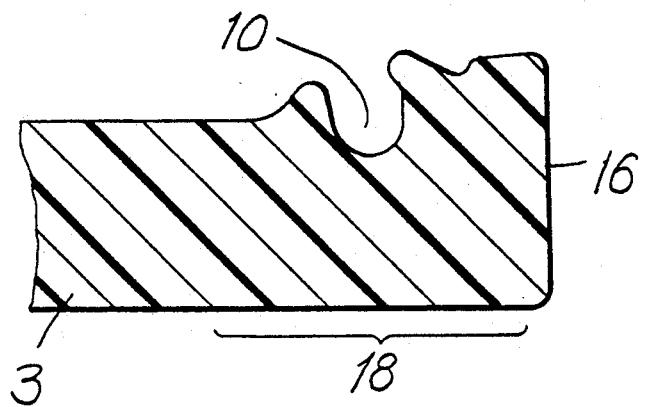
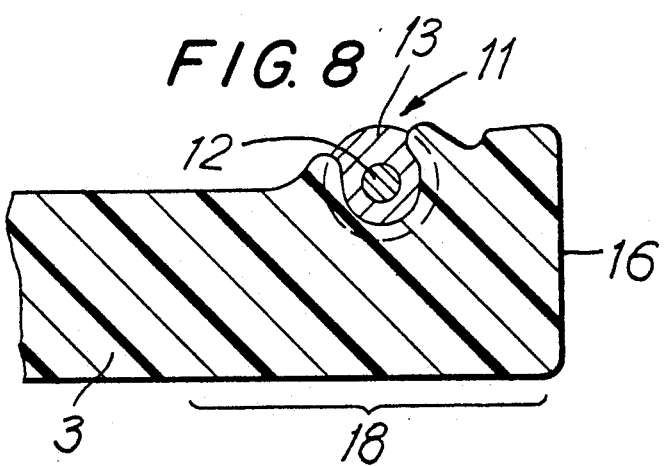

CONNECTING SECTION, ESPECIALLY FOR A WINDOW, DOOR OR FACADE WALL

BACKGROUND OF THE INVENTION

The present invention relates to a connecting section, especially for a window, door or facade wall.

A known connecting section includes two metal sections, which are held spaced from each other and by at least one isolating bar inserted in isolating-bar receiving grooves in the metal sections. Grooved longitudinal members are provided in the metal sections and held in recesses extending longitudinally in the isolating bars after elastic deformation on assembly and the isolating bar has interiorly at least one slot opening to one of the metal sections, in which a metal wire with anchoring projections is placed. The metal wire is such that it sinks into the material of the metal sections and the isolating bar on deformation of the grooved longitudinal members to fit them into the recesses in the isolating bar on assembly.

A connecting section of this type is described in German Patent 29 37 454. In this connecting section the metal wire is provided with a milled edge which acts as the anchoring projections. On deformation of the grooved longitudinal members the wire sinks into the metal sections and the isolating bar and the shear strength of the connecting section section increases because of the better fit of the component parts with each other.

Also a multiedged wire can be used as the metal wire as described in the literature. This multiedged wire is twisted to provide a plurality of effective projections over its entire length.

Both milling a round cross sectioned wire and twisting a multiedged wire are not particularly effective ways to produce a metal wire for the above purposes, because the precision or accuracy of making the projections over the length of the wire varies so that the accuracy of the wire regarding assembly in the connecting sections does not remain constant over its entire length.

SUMMARY OF THE INVENTION

It is an object of the present invention to provide a connecting section of the above-described type having at least one inserted metal wire to increase the shear strength of the section, which is formed so that the metal wire sinks more uniformly in the metal section and the isolating bar over the entire length of the slot in which it resides on assembly and so that the trueness of the metal wire required for an orderly precise assembly is thus guaranteed.

According to the present invention the metal wire with anchoring projections comprises a linear core wire strand and an outer strand helically wound about the core wire strand in a plurality of coil turns, adjacent turns of the outer wire strand being spread apart so that they do not contact each other.

Cavities for insertion of material of the grooved longitudinal members of the metal sections and the isolating bars, are formed between the coil turns of the outer wire strand. These cavities are bounded by the core wire strand and their depth is determined by the diameter of the outer wire strand.

On pressing of the longitudinal members of the metal sections on the metal wire and into the isolating section the core wire strand acts as abutting wall while the coil turns of the outer wire strand sink into the material of the longitudinal members and the isolating bar. After assembly for making of the connecting section the outer wire strand wound around the core wire strand is embedded both in the plastic material of the isolating bar and also the metal material of the longitudinal member so that the shear strength of the connecting section is substantially increased by the presence of the outer wire strand wound around the core wire strand.

The core wire strand and the outer wire strand wound around it are advantageously made from an aluminum alloy, whose strength is greater than that of the plastic material of the isolating bar and the material of the metal section. This aluminum alloy may be an aluminum-magnesium alloy.

In one advantageous embodiment of the invention the outer wire strand is coated with a fusible adhesive material, which is activated at a temperature occurring in various surface treatments of the metal section, such as eloxadizing and/or coating treatments.

Advantageously both the outer wire strand and the core wire strand have a diameter of about 0.5 mm.

Similarly, the outer wire strand may be put together from a number of wire segments.

BRIEF DESCRIPTION OF THE DRAWING

The objects, features advantages of the present invention will now be illustrated in more detail by the following detailed description, reference being made to the accompanying drawing in which:

FIG. 3 is an enlarged cutaway cross sectional view of a portion III of the connecting section shown in FIG. 1 prior to assembly, FIG. 4 is an enlarged cutaway cross sectional view of a portion IV of the connecting section shown assembled in FIG. 2, FIG. 5 is a cutaway partial cross sectional view of another embodiment of the connecting section according to the invention, FIG. 6 is a side elevational view of a metal wire of the invention comprising a core wire strand and a outer wire strand twisted around it, FIG. 7 is a detailed cross-sectional view of an edge region of an isolating bar showing a longitudinal slot for the metal wire without the wire inserted; and FIG. 8 is a detailed cross-section view of the edge region and slot shown in FIG. 7, but with the metal wire according to the invention inserted.

DETAILED DESCRIPTION OF THE PREFERRED EMBODIMENTS

Figure 1:
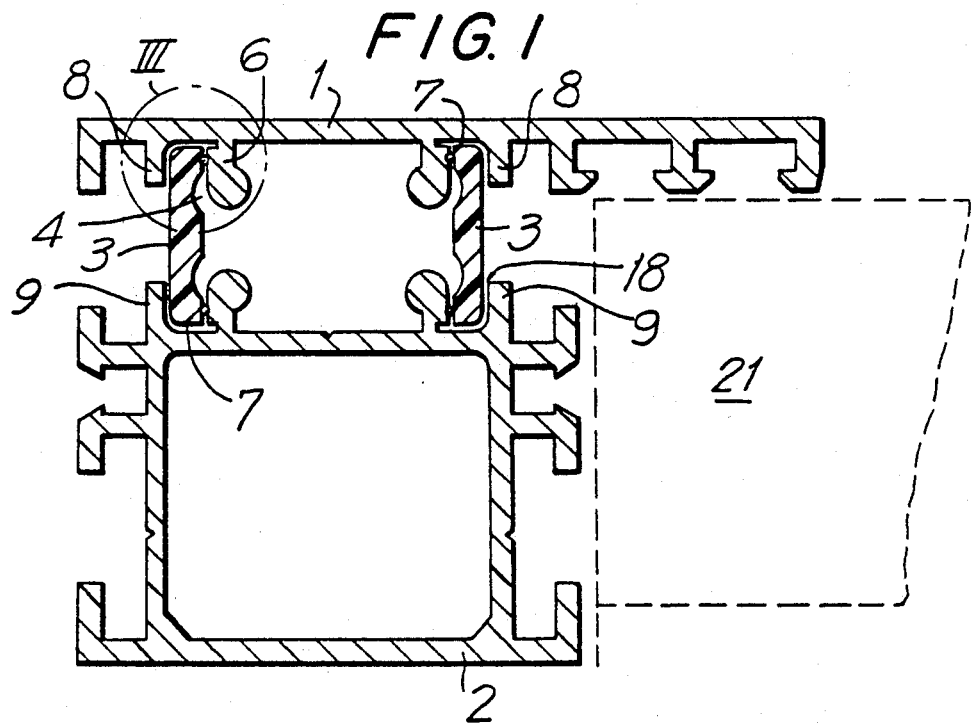
FIG. 1 is a transverse cross sectional view of a connecting section according to the invention having two metal sections and two isolating bars prior to assembly.
Figure 2:
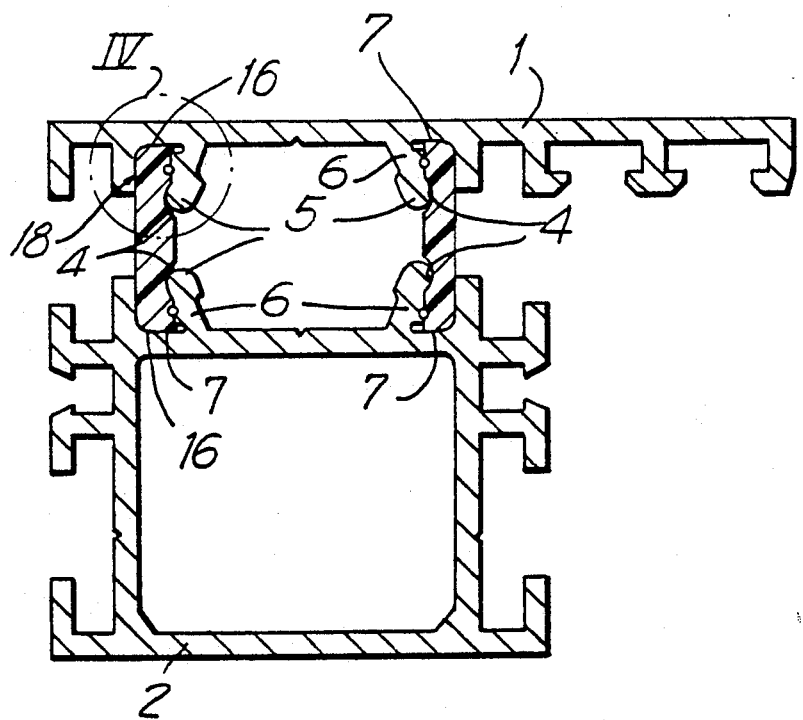
FIG. 2 is a similar cross sectional view of the connecting section after assembly.

The connecting section shown in FIGS. 1 and 2 is made up of two metal sections 1,2 and the isolating bars 3. The isolating bars are provided with longitudinally extending receiving recesses 4, in which, as seen from FIG. 2, retaining edge portions 5 of the grooved longitudinal members 6 of the metal sections 1,2 are made to fit by deformation of the longitudinal members.

The isolating bars 3 have a strength which is high enough so that they are completely or largely retained after assembly, when the retaining edge portions 5 are fit and held in the recesses 4 of the appropriate cross sectional shape and size by elastic deformation. The isolating bars 3 are made of plastic material.

The isolating bars are, as shown in FIGS. 1 and 2, provided with edge regions 18. Their edge regions 18 are received by isolating bar-receiving grooves 7 of the metal sections. These grooves 7 are bounded on one side by the longitudinal members 6 and on the other side by the longitudinal members 8 and 9.

Each of the isolating bars 3 is provided with slots 10 in the vicinity of the opposite lateral edges 16 of the isolating bars, which are formed in the isolating bar on extrusion and which extend over the entire length of the isolating bar. These slots 10 serve for receipt of the metal wire 11, which is made of a linearly, extending core wire strand 12 and an outer wire strand wound around the core wire strand 12 thus forming a screw-like structure. The individual coil turns 14 of the outer wire are spread out from each other so that they do not contact each other laterally. The core wire strand 12 and the outer wire strand 13 are made of an aluminum alloy, e.g. from aluminum-magnesium alloy. The core wire strand and the outer wire strand have a greater strength or hardness than the isolating bar 3 and the metal sections 1 and 2.

As shown in detail in FIGS. 7 and 8 on deformation of the grooved longitudinal members 6 from the position shown in FIG. 3 into the position according to FIG. 4 the outer wire strand 13 wound around the wire strand core 12 sinks into the material of the grooved longitudinal member 6 and into the bounding surfaces of the slot 10. Thus the shear strength between the metal section and the isolating bar or bars is increased.

The outer wire strand wound around the core wire strand can be assembled or put together from a plurality of wire strand segments.

The outer wire strand can be covered with a fusible adhesive, which softens at the surface treatment temperature for standard treatments, such as eloxadizing and coating, and after cooling down forms an adhesive coating or a tolerance compensating coating, since the adhesive fills the available hollow space and thus after a heat treatment guarantees sufficient shear strength in the assembled structural.

The diameter of the core wire strand 12 and the diameter of the outer wire strand is about 0.5 mm.

FIG. 5 shows an alternative embodiment of the invention. This embodiment is the same as the previous embodiment except that from FIG. 5, one sees that the isolating bar 3 in the vicinity of its edge, which is inserted in the isolating bar-receiving groove 7 of the metal section 1 or 2, can be equipped with a plurality of slots 10 for receipt of metal wires 11.

FIG. 1 shows the connecting section according to the invention engaged with the facade wall 21. The connecting section includes a joint between two metal sections 1 and 2, which may be connected to other parts including walls and frame elements of a window frame in ways which are not the subject of the invention described in this application.

It will be understood that each of the elements described above, or two or more together, may also find a useful application in other types of structures differing from the types described above.

While the invention has been illustrated and described as embodied in a connecting section for a door, window or facade wall, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. In a connecting section comprising two metal sections and at least one isolating bar, said metal sections being held spaced from each other by said at least one isolating bar, each of said metal sections having at least one isolating bar-receiving groove and at least one grooved longitudinal member, each of said isolating bar-receiving grooves being bounded on one side by one of said grooved longitudinal members, each of said isolating bars having two opposing longitudinal edge regions, each of said longitudinal edge regions being provided with a longitudinally extending recess and at least one longitudinally extending slot, one of said longitudinal edge regions of said at least one isolating bar being received in one of said isolating bar-receiving grooves of one of said metal sections and the other of said longitudinal edge regions being received in one of said isolating bar-receiving grooves of the other of said metal sections, said grooved longitudinal members of said metal sections being deformed to fit in said receiving grooves of said at least one isolating bar so that said at least one isolating bar is held between said metal sections; and a metal wire with anchoring means sunk into each of said slots in said isolating bar, the improvement wherein the metal wire (11) with anchoring means consists essentially of a linear core wire strand (12) and an outer wire strand (13) helically wound about said core wire strand (12) in a plurality of coil turns (14), adjacent ones of said coils turns of said outer wire strand (13) being spread apart so as not to contact each other.

2. The improvement as defined in claim 1, wherein said outer wire strand (13) comprises a plurality of wire strand segments.

3. The improvement as defined in claim 1, wherein said outer wire strand (13) is provided with a coating of fusible adhesive, said fusible adhesive being activatable in a surface treatment of said metal sections (1,2).

4. The improvement as defined in claim 1, wherein said core wire strand (12) and said outer wire strand (13) are both made from an aluminum alloy.

5. The improvement as defined in claim 4, wherein said aluminum alloy is an aluminum-magnesium alloy.

6. The improvement as defined in claim 3, wherein said surface treatment includes eloxadizing at a temperature sufficient to activate said fusible adhesive.

7. The improvement as defined in claim 3, wherein said surface treatment includes coating at a temperature sufficient to activate said fusible adhesive.

8. The improvement as defined in claim 1, wherein said core wire strand and said outer wire strand each have a diameter of about 0.5 mm.

* * * * *